United States Patent [19]

Chilton

[11] 3,998,098
[45] Dec. 21, 1976

[54] DISPOSABLE THERMOMETER

[76] Inventor: George Chilton, 144 Valley Road, Haworth, N.J. 07461

[22] Filed: Sept. 22, 1975

[21] Appl. No.: 615,491

[52] U.S. Cl. .................................. 73/356; 73/358; 116/114.5
[51] Int. Cl.² .................. G01K 11/12; G01K 11/06
[58] Field of Search .................... 73/352, 356, 358; 116/114 V, 114 Y, 114.5

[56] References Cited
UNITED STATES PATENTS

| | | | |
|---|---|---|---|
| 2,490,933 | 12/1949 | Tornquist et al | 73/358 |
| 2,543,161 | 2/1951 | Faus | 116/114.5 |
| 2,614,430 | 10/1952 | Ballard et al. | 73/358 |
| 3,243,303 | 3/1966 | Johnson | 116/114 V X |
| 3,465,590 | 9/1969 | Kluth et al. | 73/356 |
| 3,835,990 | 9/1974 | Sagi et al. | 73/356 X |

Primary Examiner—Richard C. Queisser
Assistant Examiner—John S. Appleman
Attorney, Agent, or Firm—Bauer, Amer & King

[57] ABSTRACT

A disposable thermometer is provided with an elongated, transparent housing in a first portion of which is formed a plurality of cavities for receiving temperature indicating means that melt at different temperatures when an elongated, thermally conductive carrier is placed in an orifice of the user's body. The temperature indicating means are initially contained in a solid state within openings in the carrier and are discharged therefrom into the cavities by an elastomeric member that is compressed by the sliding action of a cooperating member. In one embodiment of the invention the openings in the carrier are conical. In an alternative embodiment of the invention the openings in the carrier are cylindrical and a deformable member having a plurality of slots therein that register with the openings in the carrier is secured to the carrier so that when the temperature indicating means are forced outwardly by the elastomeric means the slots in the deformable member will open in order to permit passage of the temperature indicating means to the cavities.

8 Claims, 10 Drawing Figures

U.S. Patent   Dec. 21, 1976   3,998,098
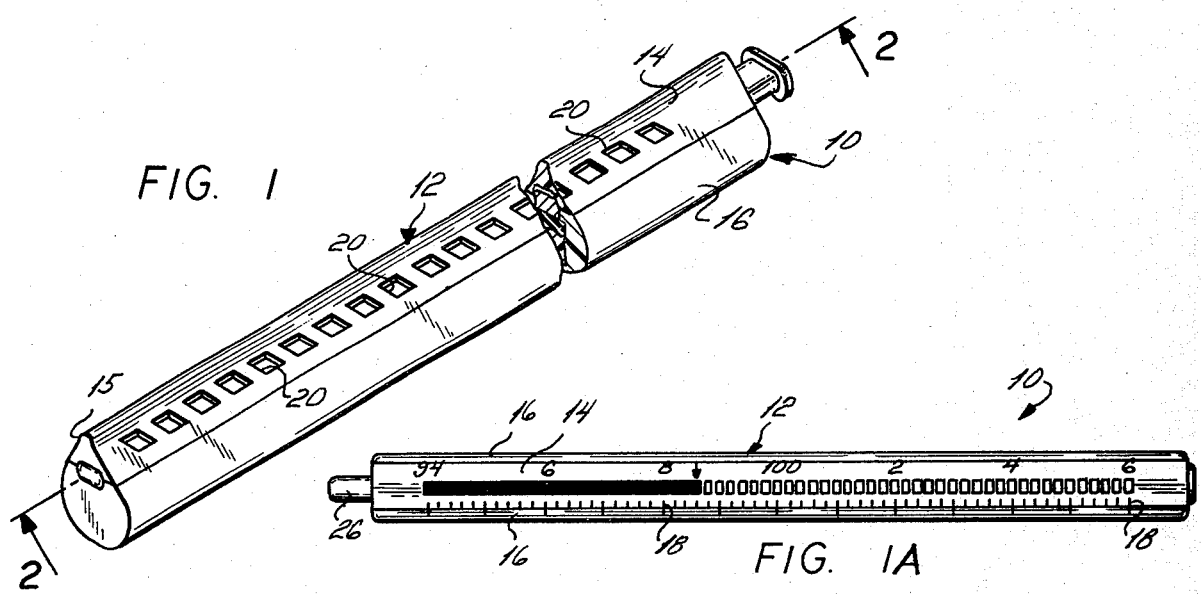
FIG. 1
FIG. 1A
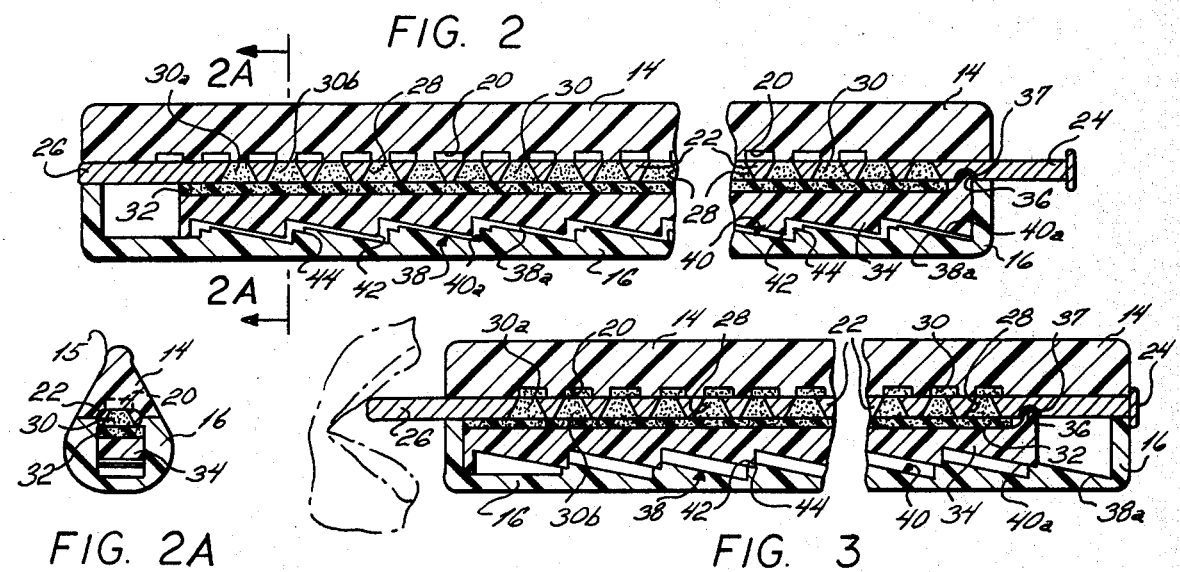
FIG. 2
FIG. 2A
FIG. 3
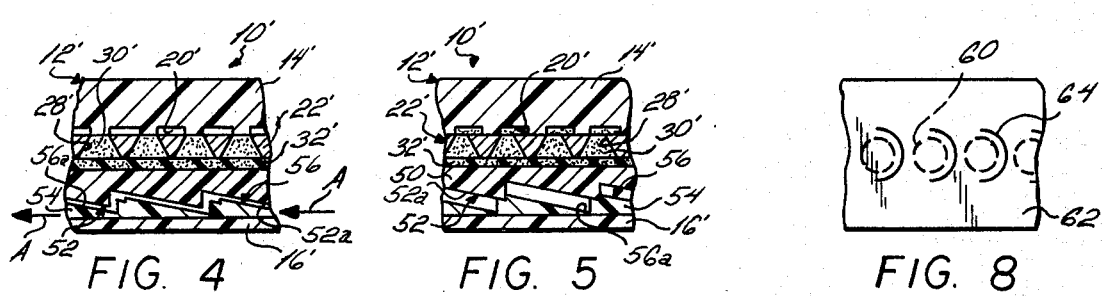
FIG. 4
FIG. 5
FIG. 8
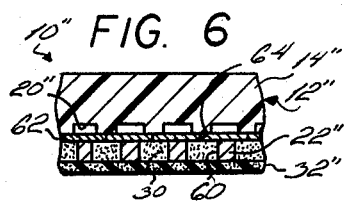
FIG. 6
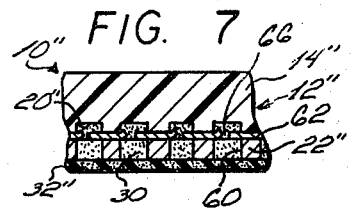
FIG. 7

DISPOSABLE THERMOMETER

The aforementioned abstract is neither intended to define the invention of the application, which, of course, is measured by the claims, nor is it intended to be limiting as to the scope of the invention in any way.

BACKGROUND OF THE INVENTION

1. Field of the Invention

This invention relates generally to clinical instruments such as thermometers and more particularly to a disposable thermometer.

2. Description of the Prior Art

The cost of taking temperatures in hospitals can be divided into two parts. That is, the cost of distributing, recovering, cleaning, sterilizing, and centrifuging and the cost of replacing broken, lost and stolen thermometers. The conventional mercury-in-glass clinical thermometer has proven to be a reliable instrument despite disadvantages such as difficulty in sterilization, difficulty in reading and inherent fragility. In spite of these disadvantages the mercury-in-glass thermometer occupies a market position that has been remarkably resistant to penetration by a wide variety of electronic and chemical devices. Basically, this is because of the familiarity established over many years of daily exposure and use by millions of people. Moreover, the mercury-in-glass thermometer is convenient to use, since it can be given to a patient for temperature measurement and recovered at any time thereafter, at the convenience of the nurse, for the purpose of reading and recording the temperature indicated, whereas, direct reading electronic thermometers require the commitment of the measuring apparatus and nurse to an individual patient until the application-read-record cycle has been completed. While a mercury-in-glas thermometer is frequently inaccurate it has sufficient accuracy for all but the most unusual cases.

Recently, disposable thermometers have been developed in order to overcome the shortcomings in the mercury-in-glas thermometer. One example of a disposable thermometer is shown in U.S. Pat. No. 3,665,770 which discloses a thermally conductive sheet having a plurality of cavities each filled with a thermally responsive substance which changes from a solid to a liquid state in graduated sequence in response to the temperature of the subject being tested. U.S. Pat. No. 3,677,088 discloses another form of disposable thermometer which includes a separable shield which is removably inserted between a thermally responsive substance and an indicating means in order to prevent communication therebetween until the thermometer is acutally used so that the storage or shelf life of the thermometer will be enhanced.

The foregoing patents use devices which employ the change in state of a substance from solid to liquid (melting point) to either indicate directly U.S. Pat. No. 3,175,401 change from opaque to translucent) or indirectly (U.S. Pat. Nos. 3,704,985 and 3,677,088, etc., dissolve a dyestuff and stain a masking layer or diffuse into an indicating web).

In utilization of thermometers of this type it must be appreciated that the thermometer, either in storage or during transportation, is liable to be exposed to temperatures in excess of the intended range of application. Unless suitable means are provided, premature indication of temperature will render such a device worthless.

The devices described by Picket, Lang, et al solve the problem of premature temperature indication by separating the temperature responsive substance (material of precise melting temperature) from the indicating means (dyestuff and masking layer) until such time as it is desired to use the device, at which time the temperature responsive substance is brought into contact with the indicating means. This requires the assembly of two planar matrices (or material and indicator) with precise registration by means which are comparatively complex.

The resulting single use thermometer is a planar array of discrete assemblies of temperature responsive substance ans associated indicator means. The thermometer so formed is flexible. The temperature sensitive and indicating area is about ⅜ x 1 x 0.010 thick.

The flexibility and size make this thermometer difficult to place exactly adjacent the sublingual artery when taking oral temperatures, and make it exceedingly difficult to insert into the rectum when rectal temperature measurement is required.

SUMMARY OF INVENTION

The present invention overcomes the shortcomings in the prior art in that a molded plastic housing is provided in which at least the front portion is transparent. A plurality of cavities are formed in the front portion for receiving temperature indicating means when an elongated, thermally conductive carrier of the thermometer is placed in an orifice of the user's body. The temperature indicating means is initially in a solid state and after it melts, it is formed by a compressible, elastomeric member out of the carrier and into the cavitites wherein it may be observed. Since the temperature indicating means in each opening in the carrier melts at a different temperature only those temperature indicating means, which are at or below the temperature corresponding to the temperature of the object to be measured, will be melted. Thus when any of the cavities in the housing are occupied by the temperature indicating means it will be evident that the temperature associated with each cavity and which is marked on the housing will have been reached.

In the present invention the elastomeric means is compressed by a member that slides relative to the carrier. That is a sliding member moves longitudinally and, by virtue of the interaction of cooperating cam and ramp means, exerts a force on the elastomeric member which force is substantially perpendicular to the direction of movement of the sliding member.

In one embodiment of this invention the openings in the carrier for the temperature indicating means are conical so that the temperature indicating means which is normally in a solid state will not readily flow therethrough. However, when the temperature indicating means melt and when the elastomeric member is compressed the temperature indicating means may flow through the smaller end of the conical opening and into the cavity in the housing that is associated therewith.

Alternatively, the present invention also provides a carrier having non-conical holes or openings which may be cylindrical in cross-section. In order to provide a barrier or seal, a deformable member is secured to the cavity in this alternative embodiment. The deformable member is provided with a plurality of slots so that, when the temperature indicating means melt and the elastomeric member is compressed, the slots will open to permit passage of the melted temperature indicating means therethrough.

Accordingly, it is an object of the present invention to provide an improved disposable thermometer.

Another object of the present invention is to provide an improved, disposable thermometer, as described above, wherein the temperature indicating means are displaced, when melted, by means of an elastomeric member.

A further object of the present invention is to provide an improved disposable thermometer, as described above, including means for effectively sealing and preventing the flow of the temperature indicating means until such time as the temperature indicating means melts.

These and other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts.

In the drawing:

FIG. 1 is a fragmentary, perspective view of one embodiment of the present invention;

FIG. 1A is a front view of the thermometer after use;

FIG. 2 is a longitudinal, sectional view taken along line 2—2 of FIG. 1 illustrating the disposable thermometer comprising the present invention prior to its use;

FIG. 2A is a sectional view taken along line 2A—2A of FIG. 2;

FIG. 3 is a view similar to FIG. 2 but illustrating the disposable thermometer comprising the present invention in use;

FIG. 4 is a longitudinal, sectional view fragmentarily illustrating an alternative embodiment of the present invention prior to its use;

FIG. 5 is a longitudinal, sectional, elevational view fragmentarily illustrating the embodiment shown in FIG. 4 during use;

FIG. 6 is a fragmentary, longitudinal, sectional view illustrating still another embodiment of the present invention prior to its being used;

FIG. 7 is a fragmentary, longitudinal, sectional view of the embodiment shown in FIG. 6 in use;

FIG. 8 is a fragmentary, plan view of one of the components shown in FIG. 6 and in FIG. 7.

DESCRIPTION OF THE PREFERRED EMBODIMENT

Referring now to the drawing there is shown in FIG. 1 the improved, disposable thermometer 10 comprising the present invention. The thermometer 10 comprises a housing generally designated by the reference character 12 which includes a front portion 14 and a rear portion 16. Preferrably, the front portion 14 is transparent. The outside surface of the front portion 14 is provided with a plurality of indicia 18 representing the range of degrees through which the thermometer 10 is designed to operate. In the embodiment illustrated the housing 12 has a generally triangular cross-section and is approximately 4 inches long. The scale range is between 94° F and 106° F and the scale length is approximately 3 inches or 4.0° F per inch. It should be noted that this is about twice as long as the average mercury-in-glass thermometer which has a scale length of approximately 1 ½ inches or 6.5° F per inch. The housing section 14 and 16 may be injection molded polystyrene and may be joined together in any suitable manner such as by adhesive, by interfitting elements, by ultra sonic welding, etc.

Referring now to FIG. 2 and 3 it will be seen that the front section 14 is also provided with a plurality of cavities 20 which extend along the length thereof in a column. Since at least the front section of the thermometer 10 is transparent the cavities 20 and any contents thereof are visible from the outside and, as may be seen in FIG. 1, are aligned with the indicia 18.

The edge of section 14 is formed as a cylindrical lens 15 focussed on cavities 20 to magnify the cavities. By making the cavities elongated in a direction transverse to the column a wide band which is highly visible is presented. This is shown in FIG. 1A with a temperature reading of 98.6°.

In the first embodiment of this invention an elongated, thermally conductive carrier 22 is slidably positioned within the housing 12. AS shown in FIG. 2 for example the right hand end of the carrier 22 is in the form of an external plunger 24 while the left hand end 26 of the carrier 22 functions as the bulb in a mercury-in-glass thermometer and is adapted to be inserted into a body orifice such as the mouth as shown in FIG. 3. The carrier 22 is further provided with a plurality of conical openings 28, which prior to activation of the thermometer, are oriented intermediate the cavities 20 as shown in FIG. 2 When the plunger 24 is moved to the left to the FIG. 3 position, the openings 28 in the carrier 22 will be aligned with the cavities 20. It should be noted that the larger diameter of the openings 28 is approximately 0.050 inch while the smaller diameter of the cavities 28 are approximately 0.008 inch Each cavity 28 in the carrier 22 is filled with temperature indicating means 30 which, in the embodiment illustrated, are different, solid solutions of orthochloronitrobenzene (OCNB) and orthobromonitrobenzene (OBNB) which are selected to melt at the various temperatures corresponding to those indicated by the indicia 18. For example, the temperature indicating means 30a loaded into the opening 28 that is closest to the end 26 will melt when the temperature being measured is 96.0° F while the temperature indicating means 30b in the next opening 28 will melt when the temperature being measured is 96.2° F and so on until each opening 28 is filled.

Since the carrier is in thermal equilibrium between the patient and the ambient, a temperature gradient will exist along the length of the carrier. For example, if the patients temperature is 98.6° F, the carrier tip inserted into the patient will reach that temperature, but the opposite end of the carrier will be at some temperature below 98.6° F. The gradient will depend upon:

1. The ambient temperature (which is relatively constant).

2. The thermal conductivity of the carrier (which is high).

3. The insulating qualities of the housing (which is high).

Hence the error will be small, but finite and may be compensated for by having the solution in the 98.6° F cavity melt at let's say 98.2° F, depending on experimental determinations. This problem also exists in mercury thermometers (emergent stem correction).

The solid solution temperature indicating means are dispensed in liquid form into the openings 28 in the carrier 22 which is then maintained at a temperature low enough to immediately freeze the dispensed liquid. The linear nature of the order of filling of the openings 28 in the carrier 22 lends itself directly and easily to automatic filling techniques of small quantities of liquids which are well known. After the filling of the carrier 22 is complete the temperatures indicating means 30 in the openings 28 will be retained because of the shape of the openings 28 as well as the fact that this material adheres to the carrier which may be made of aluminum. Should the temperature of the material 30 reach its melting point, capillary attractions will prevent the liquid from running out of the openings 28. For purposes to be described more fully hereinafter, the various solutions of OCNB and OBNB also contain dye stuffs of different colors which are not present in sufficient quantity to substantially affect the melting temperatures of the solutions 30. By way of example the temperature indicating means 30 corresponding to the temperatures from 96.0° F to 98.0° F may be dyed blue; those corresponding to temperatures from 98.2° to 99.0° F may be dyed yellow; while those corresponding to temperature from 99.2° to 106.0° F may be dyed red. It will be evident that, when viewed from the front as in FIG. 1A in the manner of a mercury-in-glass thermometer, there will appear to be a continuous column of colored material even though the colored substances are present in discrete, separate sections with the length of the column corresponding to the temperature that is achieved. In this instance the temperature shown is 98.6° F.

Directly below the carrier 22 there is provided a compresible elastomeric foam material 32 that is rigidly secured to the carrier 22. The foam is preferably of a closed pore type. If an open pore type is used a thin flexible polymer film barrier such as polyvinyl chloride may be adhered to carrier 22. One purpose of the elastomeric material 32 is to provide a creep barrier which prevents the temperature indicating means 30 in a liquid state from creeping across the narrow gap between the openings 28 which might happen if temperatures above their melting points are achieved for any length of time.

Coupled to the carrier 22, for movement together therewith, is the means for compressing the elastomeric material 32. The compresing means take the form of a slide 34 having a key 36 at one end that interfits with a notch 37 formed on the underside of the carrier 22. The slide member 34 is provided with a sawtooth configuration 38 on the underside thereof that cooperates with a similarly formed sawtooth configuration 40 on the inside, confronting surface of the rear portion 16. When the carrier 22 is moved to the left and assumes the position shown in FIG. 3 it will be appreciated that the longitudinal sloping portions or cams 38a of the sawtooth 38 will ride upwardly along the longitudinal sloping portions or ramps 40a of the sawteeth 40 and thereby compress the elastomeric material 32. In order to lock the thermometer 10 in the activated position of FIG. 3 the corner 42 of each sloping portion 38a engages a notch 44 formed at the end of each sloping portion 40a as shown in FIG. 3.

When the plunger 24 is moved to the left and the elastomeric member 32 is compressed only those temperature responsive substances which melt 30 will be forced into the cavities 20 so that they are visible from the front of the thermometer 10. It will be appreciated however that the thermometer 10 may be subjected to temperatures above the melting point of the temperature indicating means 30 but there will be no indication visible that such a temperature has been reached if the elastomeric material 32 has not been compressed.

An alternative embodiment of the present invention is shown in FIG. 4 and in FIG. 5. In this second embodiment the thermometer 10' is once again provided with a transparent front portion 12' having a plurality of cavities 20' positioned along the length thereof. The carrier 22' is provided with a plurality of conical openings 28' in order to receive the differently melting temperature indicating means 30'. As in the previous embodiment an elastomeric strip 32' is positioned against the surface of the carrier 22' in which the larger diameter of the openings 28'are formed.

In contrast to the first embodiment of this invention a plastic member 50 is rigidly secured to the opposite surface of the elastomeric member 32'. The member 50 is provided with a sawtooth configuration 52 having ramps 52a on the surface thereof that is opposite the elastomeric member 32'. a slideable plunger 54 is positioned intermediate the member 50 and the rear portion 16' and is provided with a sawtooth configuration 56a. Thus, as the slideable member 54 is moved from right to left as shown by the arrows A in FIG. 4 the cams 56a will bear against and ride upwardly along the ramps 52 to thereby urge the member 50 in a direction that is substantially perpendicular to the direction of the arrows A so as to compress the elastomeric member 32'. As in the previous embodiment, this action forces the temperature indicating means 30' out of the openings 28'and into the cavities 20'. When the plunger 54 has been moved to the left as described above, the physical relationship as shown in FIG. 5 will be assumed. It will be appreciated that the second described embodiment is different from the first described embodiment in that the member 50 is rigidly secured to the elastomeric member 32' and the member 54 is separate from the rear portion 16'.

Turning now to FIGS. 6, 7 and 8 there is shown still another alternative embodiment of the present invention. This third embodiment does not require the conical openings in the carrier that were described in connection with the first two embodiments. As shown in FIG. 6 for example the thermometer 10'' includes a front portion 12'' having a plurality of cavities 20'' formed on the inside surface thereof. A carrier 22'' is provided with a plurality of openings 60 therethrough in the same manner as the openings 28 and 28' in the first two embodiments. However, the openings 60 are not conical. In the embodiment illustrated in FIG. 6, the openings 60 are circular in transverse cross-section but could of course assume any shape. The distinction of this last mentioned embodiment is that the openings 60 have parallel side walls in order to minimize the cost of manufacture thereof. In the first two embodiments described hereinabove, the conical openings 28 and 28' serve to limit the flow of the temperature indicating means 30. In order to accomplish the same purpose, a thin layer of material 62, for example aluminum, is secured to the surface of the carrier 22'' that is immediately adjacent to the cavities 20''. The layer 62 is provided with a plurality of slots 64 such as shown for example in FIG. 8. Thus, when the elastomeric material 32'' is compressed by structure such as shown in either of the two previous embodiments the layer 62 will deform to define openings 66 as shown in FIG. 7 so that the melted temperature indicating material 30'' may flow into the cavities 20''. Because the layer 62 is only partially punched through it forms a better seal for the non-compressed temperature indicator material 30'' but readily bends to permit the free flow of the melted or liquified temperature indicating material 30'' under compression of the elastomeric material 32''. The type of opening 66 shown in this last embodiment can be easily formed using cylindrical punch and die if the face of the punch is ground at an angle and the stroke of the punch is limited to prevent complete penetration.

It has been found that while the chemicals OCNB and OBNB, when pure, melt at an exact temperature, they do not freeze at that same point. They supercool and can remain liquid at many degrees below the melting point. This can give rise to a problem by exposure to over-temperature during storage. To eliminate this problem it is desireable to add a non-reactive nucleating agent to prevent the super cooling. Finely divided silicon carbide particles of about 400 mesh size will be satisfactory. Several particles may be introduced into the opening subsequent to adding the liquid.

The present invention consists of an elongated, rod-like thermally conductive carrier into which is formed a plurality of openings which are filled with thermally responsive substances. A molded transparent plastic housing surrounds the carrier, except for the end of the carrier which is to be inserted into the orifice of the body of the subject whose temperature is to be measured. The front portion of the housing is transparent, permitting a view of a plurality of cavities formed on the inside of the front portion of the housing which correspond in position to the openings in the carrier which bear the temperature responding substances. The temperature responding means is initially in a solid state, and if its temperature rises to its melting point the liquid formed is forced, by means of a compressible elastomeric member, from the opening in the carrier into the corresponding cavity in the transparent front portion of the housing, wherein its presence may be observed. Since the temperature responding means in each cavity in the carrier melts at a different temperature only those temperature responding means which are at or below the temperature corresponding to the temperature of the object to be measured will be melted. Thus when any of the cavities in the housing is occupied by the temperature responding means it will indicate to the viewer that the temperature associated with each such cavity, has been reached.

To facilitate the reading of the temperature achieved, the outside of the front surface of the housing is marked with a suitable scale and indicia, in a manner similar to that used to mark the scale of a conventional mercury-in-glass thermometer. To further facilitate the reading of the temperature achieved, the front surface of the transparent portion of the housing is formed in such a manner as to constitute a cylindrical lens, parallel to the principal axis of the carrier, having its focus on the cavities within the housing, so as to magnify the apparent width of the filled cavity.

When properly viewed through the front surface of the housing, those cavities that are filled appear to be wider than they are long, and the plurality of filled cavities appears to be a column of colored material extending along the major axis of the thermometer in juxtaposition to the scale marked on the outside of the housing. Because the length and apparent width of the column are larger the instrument is much easier to read than is a conventional mercury-in-glass thermometer.

In order to render the temperature responding substances more readily visible when they have been moved into the temperature indicating cavities of the front housing, a small quantity of dye stuff may be dissolved in the temperature indicating substance which does not significantly affect the melting point of the temperature responding material; or if the dye stuff does slightly affect the melting point of the thermally responsive media, the composition of the thermally responsive media is adjusted to compensate for the induced change. It is possible, therefore, to use different dye stuffs to color code different "zones" or ranges of temperature. For example, one could use one color to indicate "sub normal" temperature range, and a second color to indicate a "normal" temperature range, and a third color to indicate an "above normal" temperature range, thereby permitting persons of limited literacy to be alerted to abnormal temperature readings.

It will be appreciated from the foregoing that an improved disposable thermometer has been disclosed. The construction described hereinabove provides greater shelf life for the disposable thermometer in that the temperature indicating material will not be displayed prior to the activation of the thermometer since the temperature indicating material is initially in a solid state and is not displaced in a liquid state until the elastomeric material is compressed.

There has been disclosed heretofore the best embodiments of the invention presently contemplated. However, it is to be understood that various changes and modifications may be made thereto without departing from the spirit of the invention.

What is claimed is:
1. A disposable thermometer comprising:
an elongated housing defined by a rear portion and a transparent front portion having a plurality of cavities formed internally therein and along the length of said housing;
an elongated, thermally conductive carrier positioned in said housing, said carrier having a plurality of openings formed therethrough and positioned along the length thereof, a portion of said carrier being adapted to be placed in an orifice of the user's body;
temperature indicating means in each said opening of said carrier, said temperature indicating means being meltable at successively higher temperatures when said thermometer is in the orifice of the user's body;
compressible, elastomeric means positioned in opposition to each said opening of said carrier;
means for compressing said elastomeric means whereby said elastomeric means applies pressure to and forces the melted portions of said temperature indicating means through said openings and into said cavities; and
said means for compressing said elastomeric means comprising a slideable plunger integral with said carrier for longitudinally displacing said carrier, a slide coupled to said carrier for movement together therewith, said slide having cam means integral therewith, there being further included ramp means integral with said rear portion and confrontingly cooperating with said cam means whereby when said plunger is depressed said cam means traverses said ramp means to thereby exert a compressive force on said elastomeric means, said force being in a direction that is substantially perpendicular to the direcion of movement of said carrier whereby said melted temperature indicating means is forced into said cavities in said front portion.

2. The thermometer according to claim 1 wherein said openings in said carrier are conical and wherein the larger diameter of said conical openings are adjacent said elastomeric means.

3. The thermometer according to claim 1 wherein said cam means and said ramp means have mating sawtooth configurations.

4. The thermometer according to claim 3 wherein at least one of said ramp means includes a notch for engaging a portion of at least one of said cam means to thereby hold said elastomeric means in the compressed condition.

5. A disposable thermometer comprising:
an elongated housing defined by a rear portion and a transparent front portion having a plurality of cavities formed internally therein and along the length of said housing;
an elongated, thermally conductive carrier positioned in said housing, said carrier having a plurality of openings formed therethrough and positioned along the length thereof, a portion of said carrier being adapted to be placed in an orifice of the user's body;
temperature indicatng means in each said opening of said carrier, said temperature indicating means being meltable at successively higher temperatures when said thermometer is in the orifice of the user's body;
compressible, elastomeric means positioned in opposition to each said opening of said carrier;
means for compressing said elastomeric means whereby said elastomeric means applies pressure to and forces the melted portions of said temperatures indicating means through said openings and into said cavities; and
said means for compressing said elastomeric means comprising cam means integral with said elastomeric means and ramp means slideable with respect thereto, said ramp means being arranged to displace said cam means in a direction substantially perpendicular to the length of said housing to thereby compress said elastomeric means whereby said melted temperature indicating means is forced into said cavities in said front portion.

6. The thermometer according to claim 5 wherein said cam means and said ramp means having mating sawtooth configurations.

7. The thermometer according to claim 6 wherein at least one of said ramp means includes a notch for engaging a portion of at least one of said cam means to thereby hold said elastomeric means in the compressed condition.

8. A disposable thermometer comprising:
an elongated housing defined by a rear portion and a transparent front portion having a plurality of cavities formed internally therein and along the length of said housing;
an elongated, thermally conductive carrier positioned in said housing, said carrier having a plurality of openings formed therethrough and positioned along the length thereof, a portion of said carrier being adapted to be placed in an orifice of the user's body;
temperature indicating means in each said opening of said carrier, said temperature indicating means being meltable at successively higher temperature when said thermometer is in the orifice of the user's body;
compressible, elastomeric means positioned in opposition to each said opening of said carrier; and
means for compressing said elastomeric means whereby said elastomeric means applies pressure to and forces the melted portions of said temperature indicating means through said openings and into said cavities.

* * * * *

UNITED STATES PATENT OFFICE
CERTIFICATE OF CORRECTION

PATENT NO. : 3,998,098
DATED : December 21, 1976
INVENTOR(S) : GEORGE CHILTON

It is certified that error appears in the above-identified patent and that said Letters Patent are hereby corrected as shown below:

Column 9, line 38, omit "s" from temperatures

Column 10, line 31, add --s-- to "temperature"

Signed and Sealed this

First Day of March 1977

[SEAL]

Attest:

RUTH C. MASON
Attesting Officer

C. MARSHALL DANN
Commissioner of Patents and Trademarks